INVENTOR.
WILLIAM GELLER
BY R. J. Frank
ATTORNEY.

*INVENTOR.*
WILLIAM GELLER

BY R. J. Frank
ATTORNEY.

3,434,003
HORIZONTAL DEFLECTION CIRCUIT
William Geller, Plainview, N.Y., assignor to General Telephone & Electronics Laboratories, Incorporated, a corporation of Delaware
Filed Nov. 17, 1966, Ser. No. 595,227
U.S. Cl. 315—27 7 Claims
Int. Cl. H01j 29/70

ABSTRACT OF THE DISCLOSURE

A solid state horizontal deflection circuit for the cathode ray tube of a television receiver is described wherein a sawtooth turn-on signal is utilized to maintain the switching transistor in saturation. The switching transistor is rapidly turned-off by the triggering of a silicon controlled rectifier coupled to the base of the transistor.

This invention relates to solid state horizontal deflection circuits for cathode ray tube scanning.

The horizontal scan signal in a television receiver is a substantially sawtooth current waveform and generates the horizontal deflection field for the electron beam in the cathode ray tube. The horizontal scan signal is standardized in the United States at the 15.75 kilocycle rate. This signal rate is substantially greater than that of the vertical sawtooth signal and for equal energy dissipation per cycle in the respective deflection circuits, over 200 times as much energy must be supplied to the horizontal deflection coils as is supplied to the vertical deflection coils. Thus, power economy or efficiency is of primary importance in the horizontal deflection circuit. The need for highly efficient television receivers is further increased by the development of compact, battery-operated receivers. The power requirements of such receivers primarily determine the operating lifetime and size of the portable power supply required. Minimizing the power requirements of portable receivers is recognized as an important factor in increasing their commercial acceptance.

The high frequency and high power requirements of the horizontal deflection circuit have heretofore favored the continued use of vacuum tube circuitry in television receivers. The recent development of high power solid state components having the ability to be rapidly switched from conduction to nonconduction, for example silicon controlled rectifiers, gate controlled switches, high power transistors and the like, have generated increasing interest in solid state deflection circuits.

While semiconductor devices are capable of switching the required reactive power for the horizontal deflection circuit of a television receiver, their performance characteristics, notably a decreasing current gain for increasing current levels, result in a loss of efficiency in high power applications. For example, high voltage transistors may be required to carry peak collector currents of 8 amperes at a peak collector voltage of 500 volts in a typical color television receiver. To maintain the transistor in saturation, a peak base current of the order of 3 amperes may be required. As a result of these high base currents, high power transistors employed in horizontal deflection circuits are characterized by relatively high base dissipation and the efficiency of the circuit is at an undesirably low level.

A further reduction in efficiency results from the high turn-off requirements of high power semiconductor devices. The turn-off current gain, or ratio of the current required to render the device nonconductive divided by the current flowing through the device, may be as low as two thereby requiring a current of several amperes to render the device nonconductive. In order to supply the necessary turn-off drive to the device, a reverse voltage which may exceed the Zener breakdown voltage of the semiconductor junction is applied to the control or base electrode of the device. This often results in a Zener breakdown of the corresponding semiconductor junction which is normally characterized by the flow of a high reverse current. As known, this is a condition of high power dissipation in the device and reduces the efficiency of the circuit.

Accordingly, an object of the present invention is to provide an improved solid state horizontal deflection circuit.

Another object is to provide a horizontal deflection circuit having improved efficiency.

A further object is to provide a horizontal deflection circuit wherein the turn-on driving circuit minimizes dissipation in the semiconductor switching device.

Still another object is to provide a turn-on driving circuit for a horizontal deflection circuit having improved efficiency.

In accordance with the present invention, a circuit is provided for generating a sawtooth signal in accordance with a frequency stable gating signal which includes a first semiconductor switching device having first, second and third electrodes. The first switching device controls the reactive power needed for the horizontal deflection coil. The device passes current from its first to third electrodes when a first polarity signal is applied to the second electrode and is rendered nonconductive by the application of a second polarity signal to the second electrode.

The third electrode of the first switching device is coupled to a reference potential. The first electrode of the first switching device is coupled to the first terminal of a deflection coil. The second terminal of the coil is coupled to a first polarity deflection voltage source. In addition, the first electrode of the switching device is coupled to the first terminals of a capacitor and a damping diode. The second terminals of the capacitor and the diode are coupled to the reference potential.

The second electrode of the first semiconductor switching device is coupled to the output terminals of a turn-on driving circuit and a turn-off driving circuit. These circuits alternately render the first switching device conductive and nonconductive in accordance with a frequency stable gating signal. The gating signal is provided by suitable frequency stable generating means.

The turn-on driving circuit provides the turn-on drive for the first switching device. When the first switching device is rendered conductive, the current flowing therethrough increases from essentially zero in a substantially linear manner until the device is rendered nonconductive. This increasing current, which may have a peak value of 8 amperes or more, is accompanied by at least a constant or more normally a decreasing current gain in the device. Thus, the turn-on drive current required at the second electrode of the device to maintain it in saturation over the dynamic range also increases. The failure to maintain the switching device in saturation results in considerable power dissipation within the device especially as the current approaches its peak magnitude. In the present invention, the turn-on driving circuit provides a turn-on current which has a substantially sawtooth waveform. The slope of this sawtooth waveform is selected so that its magnitude at any instant is sufficient to maintain the first switching device in saturation. Rather than continually applying the maximum current drive during the interval that the first switching device is conductive, the relatively high current gain of the first switching device at low current levels is utilized to increase the circuit efficiency. Typically, the current gain of the first switching device is decreased by an order of magnitude at peak conduction. Thus, supplying peak turn-on driving current throughout the period of conduction results in the switching device being heavily saturated and highly dissipative at low current levels.

The turn-on driving circuit providing the sawtooth waveform driving current includes a second semiconductor switching device having first, second and third electrodes. The first electrode of the second device is coupled to the first terminal of a first inductance. The second terminal of the inductance is coupled to a first polarity reference voltage source. In addition, the first electrode of said second switching device is coupled to the first terminal of a first capacitor and to the second electrode of a first diode. The second terminal of the capacitor and the first electrode of the diode are coupled to a reference potential. The diode is poled to pass current flowing from its first to second electrodes.

The third electrode of the second switching device is coupled to the second electrode of the first switching device. The second electrode of the second switching device is coupled to an output terminal of the generating means. The frequency stable output signal of the generating means renders the second switching device conductive whereupon a step voltage appears across the inductance of the turn-on circuit. This current increases in a substantially linear manner and flows through the second switching device to the reference potential.

At the completion of the gating signal, the second switching device is rendered nonconductive and the turn-on drive current is essentially zero. The current in the first inductance is transferred to the second capacitor in a relatively short time of the order of one microsecond. The inductance and capacitor continue to oscillate for another half cycle at which time the current in the second inductance is about the same magnitude as its peak turn-on magnitude but opposite in direction. The inductance is able to keep the current flowing in this direction due to the direction of poling of the first diode. The current continues to flow in a substantially linear manner toward zero at which time the second switching device is again rendered conductive.

During the period that the second switching device is nonconductive, the turn-off driving circuit supplies a turn-off signal to the first switching device to rapidly render it nonconductive. The first switch is required to switch from a high conductive state wherein it is conducting several amperes to essentially a zero conductivity state in a retrace period of the order of microseconds. However before the first switch may be rendered nonconductive, the stored carriers in the first switch must be swept out by the turn-off driving current. Failure to rapidly remove these carriers results in the first switch being partially conductive for a significant interval which greatly decreases the efficiency of the circuit.

To provide a high turn-off drive, the turn-off circuit includes a third semiconductor switching device having first, second and third electrodes. The first electrode is coupled to the second electrode of the first switching device and the third electrode is coupled to a second polarity reference source. The second electrode of the third switching device is coupled to the frequency stable generating means, for example by a transformer winding, so that it is rendered conductive when the second switching means is rendered nonconductive.

When the third switching device is rendered conductive, the second polarity reference voltage is applied at the second electrode of the first switching device. Increasing the magnitude of this reference voltage decreases the time required to remove the stored carriers from the first device and provides a rapid turn-off. By coupling the third electrode of the first switching device to the reference potential through a second diode, the magnitude of the second polarity voltage may be increased beyond the breakdown voltage of the first switching device without experiencing the flow of reverse current. The second diode is poled to pass current flowing from the third electrode to the reference potential.

The present horizontal deflection circuit compensates for the decreasing current gain exhibited by semiconductor switching devices by employing a sawtooth waveform turn-on driving current. As a result, the first semiconductor switching device is maintained in saturation throughout its operating range but is not driven heavily into saturation during any portion of this range. The base dissipation in this device is therefore minimized and the circuit operation is relatively efficient.

In addition the turn-off driving circuit effects a rapid turn-off of the device thereby minimizing dissipation during the retrace period without the flow of high reverse currents.

Further features and advantages of the invention will become more readily apparent from the following detailed description of a specific embodiment of the invention, in which.

Figure 1:
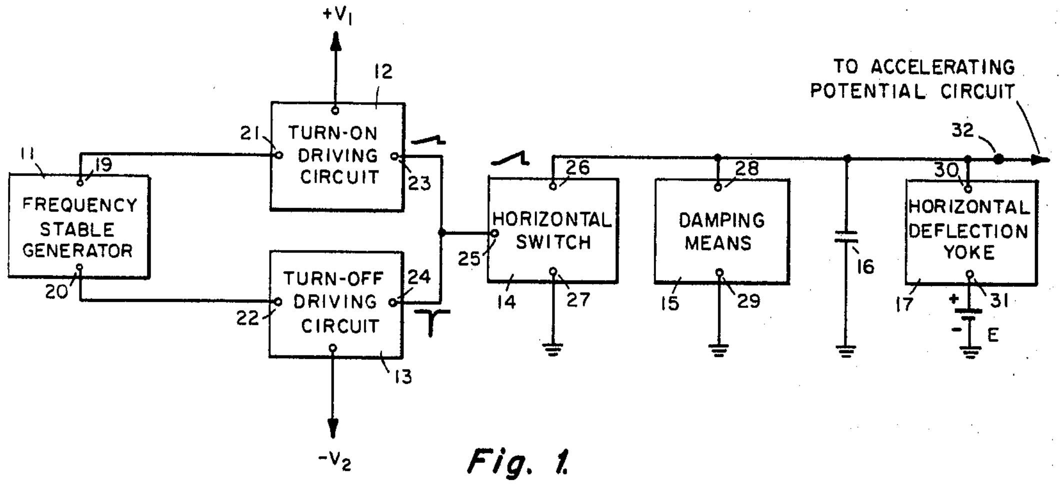
FIG. 1 is a block schematic diagram of one embodiment of the invention.

Referring now to FIG. 1, a horizontal deflection circuit is shown including a frequency stable generator 11 having output terminals 19 and 20. The generator provides a frequency stable gating signal at each output terminal with a 180 degree phase difference therebetween. The repetition rate of the gating signal determines the repetition rate of the horizontal sawtooth scan signal. The input terminal 21 of turn-on driving circuit 12 is coupled to the output terminal 19 of the generator 11. In addition, the input terminal 22 of the turn-off driving circuit 13 is coupled to the output terminal 20 of the generator 11.

The output terminals 23 and 24 of driving circuits 12 and 13 respectively are coupled to terminal 25 of horizontal switch 14. Horizontal switch 14 is rendered conductive by the application of a turn-on signal at terminal 25 and rendered nonconductive by the application of a turn-off signal thereto. Terminal 26 of switch 14 is coupled to terminal 28 of damping means 15, terminal 30 of horizontal deflection yoke 17 and to flyback capacitor 16. The flyback capacitor is returned to a reference potential, i.e., ground, as is terminal 29 of damping means 15. Terminal 31 of yoke 17 is coupled to deflection voltage source E. Terminal 27 of switch 14 is shown coupled to ground.

During operation, the horizontal switch 14 is rendered conductive resulting in the deflection voltage E appearing across deflection yoke 17. Since this is an essentially constant voltage, the current through yoke 17 increases in a substantially linear manner. The rate of increase of the current is a function of the ratio of voltage E to the inductance of the yoke. At the completion of the scan, the switch 14 is rendered nonconductive and the current in the yoke is transferred to flyback capacitor 16 in a relatively short period of about one microsecond.

The current in the yoke and the capacitor continue to oscillate for another half cycle at which time the current in the yoke is about the same magnitude as its peak magnitude when switch 14 is conductive, but is opposite in direction. The inductance of the yoke is able to keep the current flowing in this direction. The current is supplied through damping means 15 which is poled to pass current flowing from terminal 29 to terminal 28. The current continues to flow through the yoke 17 in a substantially linear manner toward zero. The voltage at terminal 26 is maintained at ground due to damping means 28 during the interval required for the yoke current to reach zero. As a result, switch 14 may be rendered conductive prior to the time that the yoke current reaches the zero level without affecting its waveform.

As mentioned, the current flowing through switch 14 is continually increasing until the device is turned off. The magnitude of the turn-on driving signal required to maintain the switch in its saturated conductive state is determined primarily by the gain of the switch. However, semiconductor switching devices capable of switching the high reactive power, typically in excess of 1500 volt-amperes, are normally characterized by a decreasing current gain for increasing current flow therethrough.

Figure 3:
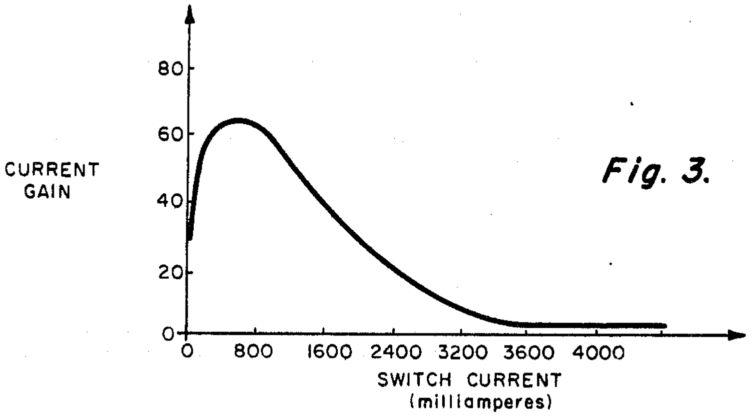
FIG. 3 is a curve showing the variation of current gain with switch current for a representative semiconductor switching device.

A curve showing the variation of current gain with switch current for a representative switching device is shown in FIG. 3. The gain rises quickly to its peak value at switch currents of less than 1 ampere whereupon it decreases by an order of magnitude or more at switch currents of several amperes. While the gain-current curve of FIG. 3 relates to a DTS 423 high voltage transistor, similar curves are obtained for other transistors having a high collector base voltage rating of about 600 volts.

Since the current through the semiconductor switching device 14 increases from zero to a peak of several amperes in a linear manner, the base current or turn-on drive current needed to keep the switching device in saturation at the peak current level is substantially greater than at the initiation of current flow through the device. Failure to keep the switching device in saturation, particularly when it is conducting high currents, results in substantial dissipation of power. This dissipation is due to the increasing voltage drop across the switching device which arises from the lack of forward biasing of the switch semiconductor junctions.

In order to minimize dissipation in the base of the switch 14, the current waveform supplied thereto by turn-on driving current is selected so that it is just sufficient to keep the switch 14 in saturation over its dynamic range. Accordingly, the current waveform of the turn-on driving current supplied to terminal 25 of switch 14 is a substantially sawtooth waveform. The turn-on driving circuit 12 provides the sawtooth current in accordance with the output of generator 11. The driving current returns to zero at the completion of the gating signal from generator 11, at which time, the turn-off driving circuit 13 is activated to provide a turn-off driving current to terminal 25 of switch 14.

The turn-off driving circuit, when activated, provides a low impedance path between terminal 24 and second polarity reference voltage $-V_2$. By selecting voltage $-V_2$ to be relatively high, for example —18 volts, any carriers stored in the semiconductor junction of switch 14 between terminals 25 and 27 are rapidly removed and the turn-off of the switch 14 effected in about one microsecond. If the magnitude of voltage $-V_2$ exceeds the breakdown voltage of the semiconductor junction of switch 14, a diode may be coupled between terminal 27 and ground to inhibit the flow of reverse current through the base of switch 14. The switch 14 remains non-conductive until the gating signal again activates turn-on driving circuit 12.

Figure 2:
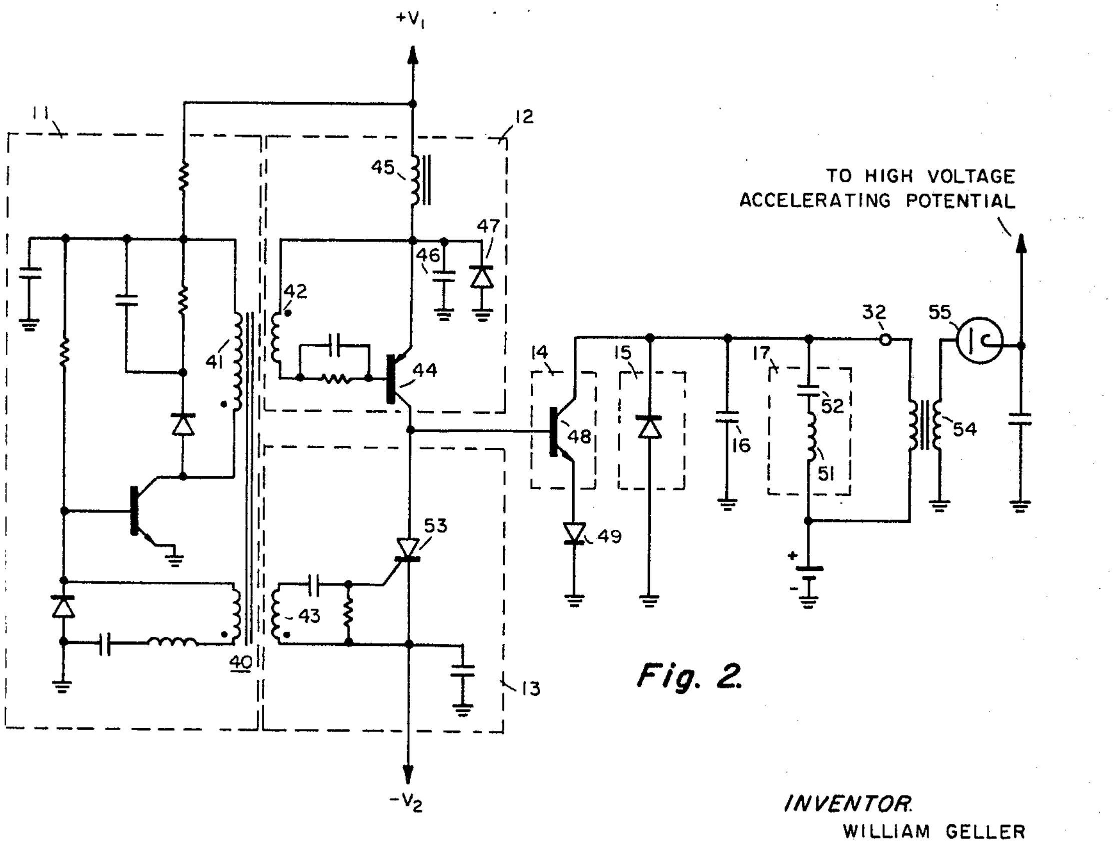
FIG. 2 is an electrical schematic diagram of the embodiment of FIG. 1.

An electrical schematic diagram of one embodiment of the invention is shown in FIG. 2. The frequency stable generator 11 is a blocking oscillator which provides a square wave gating signal on the primary winding 41 of transformer 40. While many types of frequency stable generators may be employed, the oscillator shown has been found especially well suited for use therein and is described in detail in U.S. Patent 3,155,921 issued Nov. 3, 1965, to Mr. Fischman and assigned to the same assignee as the present application.

Figure 4:
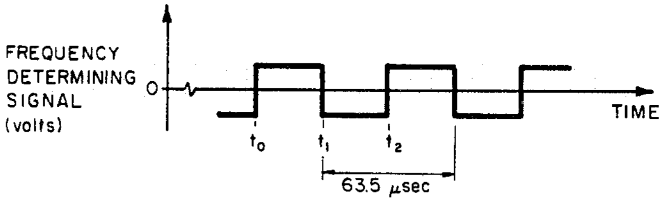
FIGS. 4 through 7 are curves showing various operating characteristics for the embodiment of FIG. 1.

The frequency determining signal shown in FIG. 4 is coupled to turn-on driving circuit 12 by secondary winding 42 wherein it renders transistor 44 conductive at time $t_0$ and maintains it in conduction until time $t_1$. In the United States, the period for a horizontal deflection signal is standardized at 63.5 microseconds. As shown, the polarities of windings 41 and 42 are opposite so that transistor 44 is rendered conductive during the positive half-period of the gating signal.

The collector of transistor 44 is coupled through the base-emitter junction of transistor 48 of switch 14 and diode 49 to ground. When the gating signal renders transistor 44 conductive, a step voltage $+V_1$ is applied across inductance 45. The current through the inductance and through transistor 44 increases in a linear manner, i.e., a sawtooth waveform, with the slope being determined by the ratio of the magnitude of $+V_1$ to the inductance 45.

Figure 5:
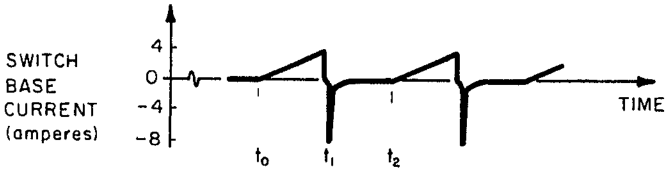
Figure 6:
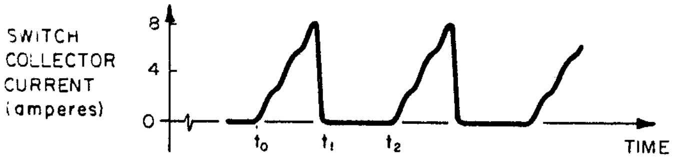
Figure 7:
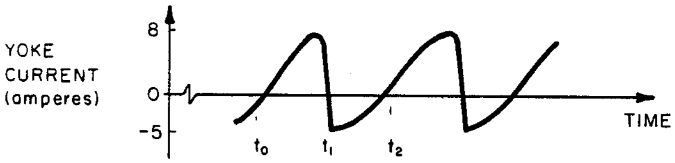

The sawtooth waveform current is supplied to the base of switch 14 and is shown in FIG. 5 during the interval $t_0$ to $t_1$. At time $t_1$, the gating signal returns to zero and transistor 44 becomes nonconductive. The turn-on driving current during the interval $t_1$–$t_0$ renders the high voltage transistor 48 of switch 14 conductive. At this time, the deflection voltage +E is applied across deflection yoke 51 and the current therethrough increases from zero in a substantially linear manner. This current flows to ground through transistor 48 and its waveform is shown in FIG. 6. The waveform departs somewhat from a sawtooth shape due to the inclusion of an S-shaping capacitor 52 in series with yoke 51.

Since the current through the collector of the transistor 48 of switch 14 is increasing with time, the turn-on drive current supplied to its base electrode also increases. The slope of the switch collector current is determined by the ratio of the magnitude of voltage +E and the inductance of yoke 17, with the magnitude of the voltage +E being selected to insure a complete scan of the cathode ray tube. The turn-on driving current supplied to the base of switch 14 has a sawtooth waveform 50 that switch 14 may be kept in saturation over the entire dynamic collector current range. Failure to keep the transistor in saturation increases the dissipation therein since the resistance of the transistor increases when it is unsaturated. This dissipation is most significant at high collector levels and it is therefore necessary to insure that the peak turn-on drive current is sufficient to saturate the transistor when it is conducting its peak collector current.

The peak magnitude of the turn-on driving current is determined by the ratio of the magnitude of first polarity voltage $+V_1$ to the magnitude of inductance 45. Since the period during which transistor 44 is conductive is set by the period of the gating signal, the peak magnitude of the turn-on driving current may be regulated in a stable manner.

As mentioned previously, the current gain of the horizontal switch transistor decreases with increasing collector current. Therefore, setting the magnitude of the peak turn-on current to maintain transistor 48 in saturation at its peak collector current insures that transistor 48 remains in saturation over its entire dynamic range. In addition, the sawtooth waveform of the turn-on driving current results in a substantial reduction in the turn-on driving power required. The power requirements is approximately one-half that required in conventional deflection circuits wherein a square-wave turn-on driving signal is employed.

The turn-off driving current for transistor 48 renders it nonconductive and is supplied thereto at time $t_1$ when the gating signal at the base of transistor 44 becomes negative. At this time, the gating signal is coupled through secondary winding 43 to the control or gate electrode of silicon controlled rectifier (SCR) 53. The polarity of winding 43 is such that at time $t_1$, a positive current flows into the gate electrode rendering the SCR conductive thereby providing a low impedance path between the base electrode of transistor 48 and second polarity reference voltage $-V_2$.

Transistor 48 can not be cut-off immediately upon termination of the turn-on driving current due to the storage of injected carriers in its base region. To effect rapid turn-off of the transistor, it is necessary to apply a turn-off drive signal to remove these stored carriers. The amount of stored carriers in the transistor 44 is minimized by the nature of the turn-on signal which maintains the transistor in saturation but does not drive it heavily into saturation.

The turn-off driving circuit 13 enables the stored carriers to be removed from transistor 48 and the device rendered nonconductive in a period of about one microsecond. The time required to effect turn-off is a function of the magnitude of second polarity voltage $-V_2$. By increasing the magnitude of this voltage, the turn-off time can be decreased. The inclusion of diode 49 between transistor 48 and ground prevents the flow of reverse current through base-emitter junction of the transistor and, therefore, the magnitude of voltage $-V_2$ may exceed the breakdown voltage of transistor 48.

At the completion of the flow of reverse current shown in FIG. 5, SCR 53 is rendered nonconductive due to the decrease in its anode current. This turn-off of SCR 53 is effected well in advance of time $t_2$ further increasing the efficiency of the horizontal deflection circuit. Although the use of turn-off driving circuit 13 containing an SCR as the switching device in combination with turn-on driving circuit 12 provides a relatively efficient horizontal deflection circuit, other turn-off circuits may be employed if desired for particular applications.

In one embodiment tested and operated at a scan rate of 15.75 kilohertz, the first switching device is a type DTS 423 transistor. The peak current through the device was 8 amperes with a peak turn-on current of 3 amperes. The peak collector voltage was 500 volts. Thus, the reactive power capability of the deflection circuit was at least 4000 volt-amperes which is sufficient to provide suitable scan signals for wide-angle shadow mask color television receivers. The second and third switching devices were a type 2N3731 transistor and a type MCR 2605-2 SCR respectively. The peak turn-off current was about 8 amperes with a second polarity voltage of −18 volts. The first switch was rendered nonconductive in 2 microseconds.

While the above description has referred to a specific embodiment of the invention, it will be recognized that many modifications and variations may be made therein without departing from the spirit and scope of the invention.

What is claimed is:

1. In a circuit for generating a sawtooth scan signal in a horizontal deflection coil in accordance with a gating signal, the combination which comprises:

(a) a first transistor having first, second and third electrodes, said first electrode being coupled to the horizontal deflection coil, said third electrode being coupled to a reference potential, said transistor passing current flowing from said coil when a first plurality turn-on drive signal is applied to said second electrode, said transistor being rendered nonconductive by the application of a second polarity turn-off drive signal to said second electrode;

(b) a turn-on drive circuit having an output terminal coupled to the second electrode of said first transistor, said drive circuit providing a first polarity sawtooth drive current to the second electrode of said first transistor in accordance with the gating signal, said drive current having a slope such that its magnitude at any instant is as large as that required to maintain said transistor in saturation; and (c) a turn-off drive circuit having an output terminal coupled to the second electrode of said first transistor, said turn-off drive circuit providing a second polarity drive signal at said output terminal, said drive signal rendering said first transistor nonconductive.

2. The combination of claim 1 in which said turn-on drive circuit comprises:

(a) a second transistor having first, second and third electrodes, said third electrode being coupled to the second electrode of said first transistor;

(b) inductance means having first and second terminals, said first terminal being coupled to the first electrode of said second transistor, said second terminal being coupled to a first polarity reference voltage source;

(c) a first capacitor having first and second terminals, said first terminal being coupled to the first electrode of said second transistor, said second terminal being coupled to a reference potential;

(d) a first diode having first and second electrodes, said second electrode being coupled to the first electrode of the said second transistor, said first electrode being coupled to a reference potential, said diode being poled to pass current flowing from said first to second electrodes, (e) means for applying the gating signal to the second electrode of said second transistor whereby said second transistor is rendered conductive and the current flowing therethrough has a sawtooth waveform; the slope of said waveform being a function of the ratio of the magnitudes of the first polarity reference voltage and the inductance means.

3. The combination of claim 2 in which said turn-off drive circuit comprises:

(a) a third semiconductor switching device having first, second and third electrodes, said first electrode being coupled to the second electrode of said first transistor, said third electrode being coupled to a second polarity reference voltage source, said device being rendered conductive by the application of a first polarity signal to said second electrode whereby said second polarity reference voltage is applied to the second electrode of said first transistor to render it nonconductive, and (b) means for applying a first polarity signal to the second electrode of said third device when said second transistor is rendered nonconductive.

4. The combination of claim 3 further comprising a second diode having first and second electrodes, said first electrode being coupled to the third electrode of said first transistor, said third electrode being coupled to a reference potential, said diode being poled to pass current flowing from said first to second electrodes.

5. The combination of claim 4 in which the third electrode of said third device is coupled to a second polarity reference voltage source having a magnitude which exceeds the breakdown voltage of said first transistor.

6. The combination of claim 5 further comprising frequency stable generating means having first and second output terminals, said means providing gating signals at said output terminals having a 180 degree phase difference therebetween, said first and second output terminals being coupled to the second electrodes of said second transistor and third switching devices respectively.

7. The combination of claim 6 in which said third switching device is a silicon controlled rectifier.

References Cited

UNITED STATES PATENTS 3,189,783 6/1965 Van Berkum _________ 315—27

RICHARD A. FARLEY, *Primary Examiner.*

C. L. WHITHAM, *Assistant Examiner.*